July 29, 1958 J. P. SCANLON ET AL 2,845,346
METHOD OF FORMING POROUS CEMENTED METAL POWDER BODIES
Filed Jan. 13, 1954
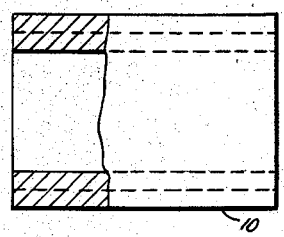
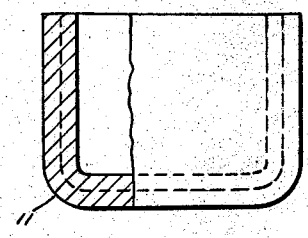
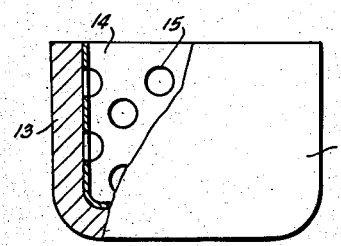
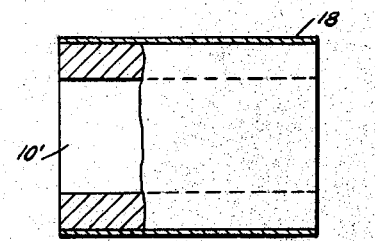
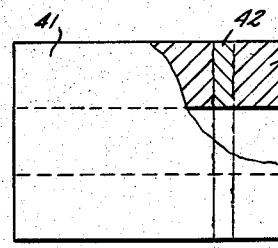
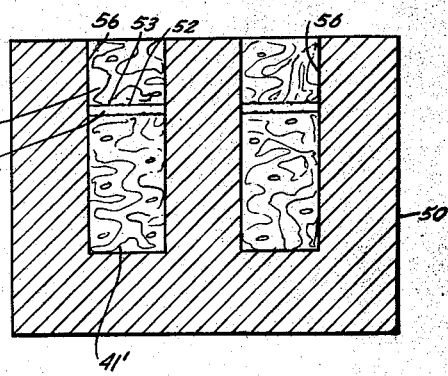
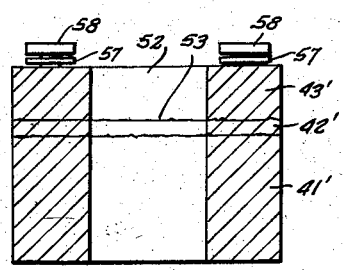
INVENTORS
J. P. SCANLON
L. ALTER
BY
Greene, Pineles & Durr
ATTORNEYS

United States Patent Office 2,845,346
Patented July 29, 1958

2,845,346

METHOD OF FORMING POROUS CEMENTED METAL POWDER BODIES

Joseph P. Scanlan, Yonkers, and Louis Alter, Bronx, N. Y., assignors to Schwarzkopf Development Corporation, a corporation of Maryland Application January 13, 1954, Serial No. 403,795

5 Claims. (Cl. 75—208)

This invention relates to sintered metal powder bodies which have interconnected pores and are ductile, coinable, and to the process of making such bodies to shape within narrow tolerances.

Among the objects of the invention is to provide a cemented metal particle body which is porous in some parts and of different porosity or of no porosity in other predetermined parts thereof, and to provide a process for making such a body.

The metal powders that may be employed in the process include any of the known metal powder particles employed in powder metallurgy processes. The invention is especially adapted for the production of bodies from stainless steel, nickel, and nickel alloy powders.

Examples of thermosetting resins that may be employed for forming the cemented body include the phenol aldehyde type of resins such as phenol formaldehyde condensation products, phenol furfural condensation products, etc., and the urea aldehyde resins such as the urea formaldehyde condensation products and the melamine condensation products. Thermosetting resins of the silicone epoxy or polyester type may also be employed, but thermoplastic resins are unsuitable. The exact amount of resin added is not extremely critical since the resin does not appear in the final product, but variation of the resins content represents a convenient method of varying the degree of porosity of the end product. The addition of ½ to 4% of resin, by weight to the metal powder, proved very satisfactory.

Reinforcing sheets or screens may be bonded to the sintered powder particle bodies by incorporating the said sheets into said body at any time in the manufacturing process prior to final sintering.

The articles made according to the invention may be from 10% to 55% porous. The porosity may be controlled by the size and size distribution of the particles employed, and also by the amount of resin and amount of pressure employed.

The foregoing and other objects of the invention will be best understood from the following description of exemplifications of the same when read in connection with the accompanying drawing in which:

Fig. 1 is a partially cross-sectional view of a bearing made according to the invention;

Fig. 2 is a similar view of a filter element made according to the invention;

Fig. 3 is a similar view of a modified form of filter element;

Fig. 4 is a similar view of a modified form of bearing;

Fig. 5 is a similar view of another modified form of bearing;

Fig. 6 is a cross-sectional view illustrating a step in the formation of the bearing of Fig. 5; and Fig. 7 is a cross-sectional view illustrating another step in the process of making the bearing of Fig. 5.

After the metal particles to be formed into a porous product have been selected, they are coated with a thermosetting resin. This may be done by mixing the particles with a solution of the resin in the soluble incompletely set, or "B" state while permitting the solvent to evaporate, leaving a coating of the resin on the particles. As such a resin solution is mixed with the metal particles while stirring, a plastic dough first forms which gradually becomes granular again as the solvent continues to evaporate. After all the solvent has been driven off, the particles are screened to remove agglomerated lumps and the powder is ready to be formed to shape. The forming is done by compacture under relatively low pressure such as, 450 p. s. i. (pounds per square inch) for example or less. Thereafter, the compacted product is heat treated to set or cure the resin. This produces a resin-bonded molded product which has all the appearance and shape of the finished produce of Figs. 1 and 2, for example, except for the luster and color. The resin-bonded molded product is then sintered in a reducing atmosphere to provide the shaped sintered metal body as shown in Figs. 1 and 2. Fig. 1 shows a porous bearing element 10 and Fig. 2 shows a porous cup filter device 11, each exemplifying a molded porous product of the invention.

Porous molded products of the invention may be combined with a continuous metallic reinforcing structure which is integrally united to and/or embodied in the bonded particle material of the molded porous body such as shown in Fig. 3. In this device 12 the outer portion 13 comprises the porous sintered metal body and the inner layer comprises a metal cup 14 containing a number of perforations 15. Woven wire mesh may also be employed as reinforcing material. The inner cup 14 is pressed into the outer portion 13 during the formation of the outer portion 13 or at any time subsequent thereto but prior to the final sintering. The outer portion 13 may be partially sintered before pressing the inner layer 14 therein. The cup 14 may contain openings of any shape such as the small holes or openings 15. The porosity of the finished product may be controlled by predetermining the size and shape of the openings 15 and 16 in the inner reinforcing member 14, and the permeability of the finished product with respect to gases or liquids may be controlled, and varied from one location to another by the number and size of the openings.

The articles made according to the invention may also be reinforced from the outside as shown in bearing 10' of Fig. 4 which is similar to the device 10 of Fig. 1, except for the outer reinforcing member 18. This reinforcing member 18 is incorporated into or cemented to the bearing 10' in the same way as the inner cup 14 is cemented to outer portion 13 in Fig. 3.

Since the pores of the bodies are interconnected, said pores may be filled by processes which permit the capillary action of the pores to cause the same to be infiltrated with molten metal. Where only a portion of the article is to be infiltrated, the passage of molten copper, for example, into the pores of a ferrous article may be stopped at a barrier comprising silver powder, the silver being a metal which suppresses flow of infiltrant copper metal past the region wherein silver is present in addition to the base metal powder. Thus, a layer of silver powder may be incorporated into the body at the time the body is first shaped. As an example, the bearing 40 of Fig. 5 of a metal, such as a steel alloy, for example, having the porous portion 41, the silver containing barrier portion 42 and the copper-filled portion 43 may be produced with a mold 50 having a mold cavity 56, such as shown in Fig. 7. The resin coated steel particles are introduced with the mold cavity 56 and pressed to the level 42' to form the porous portion 41'.

Next, steel particles coated with resin plus 2% to 10% of silver particles are introduced in sufficient amount to form a narrow barrier region 42' ending at level 43', and then resin coated steel particles such as introduced into region 41' are introduced into barrier region 43'. The amount of silver employed will depend on the sintering temperature, time of sintering, and dryness of the atmosphere. The product is formed into a resin-bonded article as described above, but the copper impregnating of the portion 43' may be combined with the sintering. Instead of using a barrier containing silver particles, it is also possible to use silver additions for the entire portions of the part which are not supposed to be infiltrated.

For impregnating or infiltering the region 43' with copper (simultaneously with or subsequent to the sintering) the set-up shown in Fig. 6 may be employed. The copper infiltrant member 58 may be separated from the article by a piece of iron 57 so that the copper, when molted, will dissolve all the iron it is capable of dissolving before coming into contact with the ferrous region 43' which is to be infiltrated. This precaution prevents the molten copper from dissolving or corroding the ferrous region 43' into which it passes. Capillary action of the pores of region 43' draw the molten copper into the pores, but the copper will not pass through barrier region 42'. As indicated above, the copper impregnating step may be performed simultaneously with the sintering step or the copper impregnating may be performed as a separate step.

The following examples illustrate specifically how the products of the invention are made.

*Example 1*

A phenol formaldehyde resin in the "B" or soluble state is dissolved in acetone. Phenolic resins in this state of condensation are available commercially. Stainless steel powder of —325 mesh particle size is placed in a mixing device and the acetone solution of the phenolic resin is added. Approximately 1½% by weight of the resin is added for this example. The mixing first produces a putty-like dough. As the mixing is continued, substantially all the acetone evaporates and powder particles are again obtained. The substantially dry resin-coated particles are then passed through a 60 mesh screen to remove large conglomerates. This powder is then filled into the cavity of a mold, and compressed at around 450 p. s. i. to produce a cup-shaped element like that of Fig. 2. The mold containing the product is then transferred to a curing oven whereupon it is treated at 450° F. for about 30 minutes to cure the resin. The resin-bonded article is then removed from the mold and placed in a gettered boat containing activated ferrochrome as the gettering material. The boat and article is then sintered in a hydrogen atmosphere at around 2300° F. for 80 minutes. After sintering, the body is cooled in a hydrogen atmosphere for another period of 80 minutes. A porous filter element like that of Fig. 2 is produced.

*Example 2*

The process is conducted as in Example 1, except that before the resin-coated powder is pressed to shape in the mold, a cup-shaped reinforcing element of perforated stainless steel is introduced therein. The article which results has the said reinforcing sheet bonded thereto.

*Example 3*

The process is conducted as in Example 1 or 2, except that nickel powder is substituted for the stainless steel powder.

*Example 4*

The process is conducted as in Examples 2 and 3, except that the stainless steel reinforcing sheet is coated with copper before being molded with the powder.

*Example 5*

The process is conducted as in Examples 1–4, except that a portion of the finished product is infiltrated. This is accomplished by introducing a barrier layer of powder containing silver as shown at 42' in Fig. 6. Prior to sintering the resin-bonded article, a piece of copper separated from the region 43' by a layer of iron is placed on the bearing as shown in Fig. 7. The resultant article will be found to be impregnated with copper in the region 43'. Prior to sintering in this way, no difference could be distinguished between the layers 41, 42, 43. After the sintering operation, irregular lines are discernible at 52 and 53 (Fig. 6) and the region 43' will be found to have a distinct copper color.

When this article is made primarily of stainless steel as in this example, it is found that the copper impregnated or infiltrated region is easier to machine than the more porous stainless steel region 41'. The products of the above examples may be finished by coining and polishing.

The products have high strength and within very narrow limits are substantially identical with the products as shaped in said original mold. The bodies can be made to very close tolerances.

The features and principles underlying the invention described above in connection with specific exemplifications will suggest to those skilled in the art many other modifications thereof. It is accordingly desired that the appended claims shall not be limited to any specific feature or details shown or described in connection with exemplifications thereof.

We claim:

1. A process of making a shaped body out of a sintered porous base-metal particle skeleton having at least one region which contains inter-connected pores which are free of infiltrant metal and at least one other region containing inter-connected pores filled with an infiltrant metal having a lower melting point than said base metal, the procedure comprising the steps of providing a shaped skeleton of base metal particles bonded together by partial sintering, providing said skeleton with at least two regions separated by a barrier region containing particles of an addition metal which at the elevated temperature of molten infiltrant metal suppresses the flow of molten infiltrant metal into the pores of said barrier region, completing the sintering of said skeleton while providing a molten infiltrant for infiltration into the pores of said body from one side of said barrier region whereby said barrier region prevents the molten infiltrant metal from infiltrating into said other region past said barrier region.

2. A process of making an accurately shaped body out of a sintered porous base metal particle skeleton having at least one region which contains interconnected pores which are free of infiltrated metal and at least one other region containing interconnected pores filled with a metal of lower melting point than said base metal comprising the steps of providing an accurately shaped skeleton of base metal particles bonded together by partial sintering, providing said skeleton with at least two regions separated by a barrier region containing particles of an addition metal which at the elevated temperature of molten copper suppresses infiltration of molten copper into the pores of said barrier region, completing the sintering of said skeleton while providing molten copper for infiltration into said body from one side of said barrier region whereby the said barrier region prevents the molten copper from infiltrating into the other region past said barrier region.

3. The process as claimed in claim 2, wherein the porous skeleton consists of bonded ferrous particles.

4. A process of making an accurately shaped body out of a sintered porous base metal particle skeleton having at least one region which contains interconnected pores which are free of infiltrated metal and at least one other region containing interconnected pores filled with a metal of lower melting point than said base metal comprising the steps of providing an accurately shaped skeleton of base metal particles bonded together by partial sintering, providing said skeleton with at least two regions separated by a barrier region containing silver particles which at the temperature of molten copper suppress infiltration of molten copper into said barrier region, completing the sintering of said skeleton while providing molten copper for infiltration into said body from one side of said barrier region whereby the said barrier region prevents the molten copper from infiltrating into the other region past said barrier region.

5. The process as claimed in claim 4, wherein the porous skeleton consists of bonded ferrous particles.

References Cited in the file of this patent

UNITED STATES PATENTS

| | | |
|---|---|---|
| 2,363,337 | Kelly | Nov. 21, 1944 |
| 2,386,544 | Crowley | Oct. 9, 1945 |
| 2,401,221 | Bourne | May 28, 1946 |
| 2,518,253 | Reis | Aug. 8, 1950 |
| 2,593,943 | Wainer | Apr. 22, 1952 |